May 17, 1966      D. M. BURKE      3,251,076
IMPACT ABSORBING MAT
Filed March 19, 1965      5 Sheets-Sheet 1
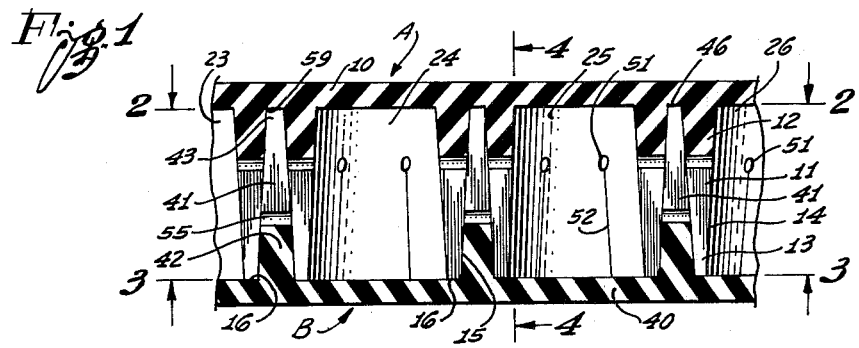
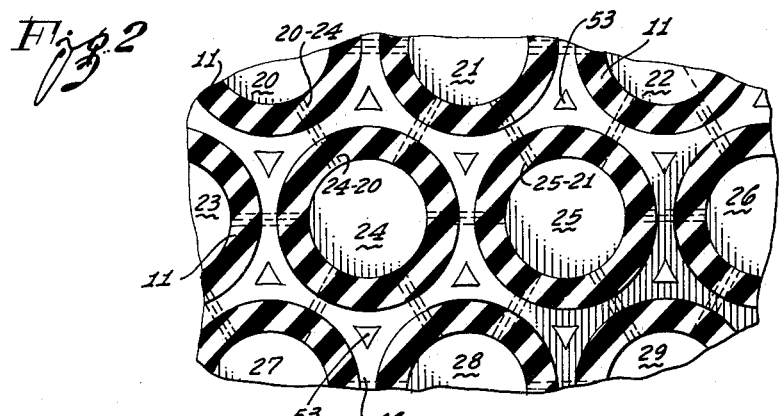
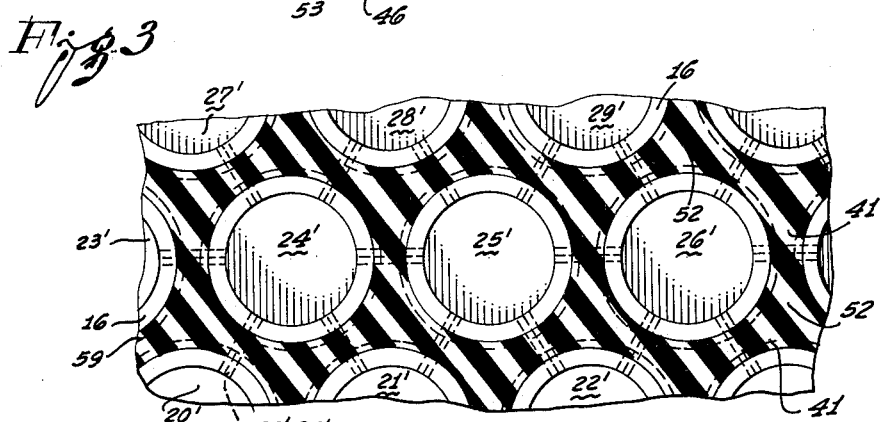
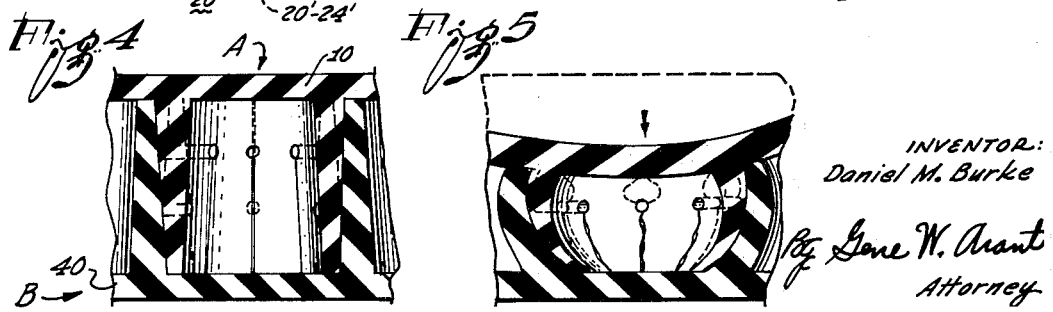
INVENTOR:
Daniel M. Burke
By Gene W. Arant
Attorney May 17, 1966 D. M. BURKE 3,251,076
IMPACT ABSORBING MAT
Filed March 19, 1965 5 Sheets-Sheet 2
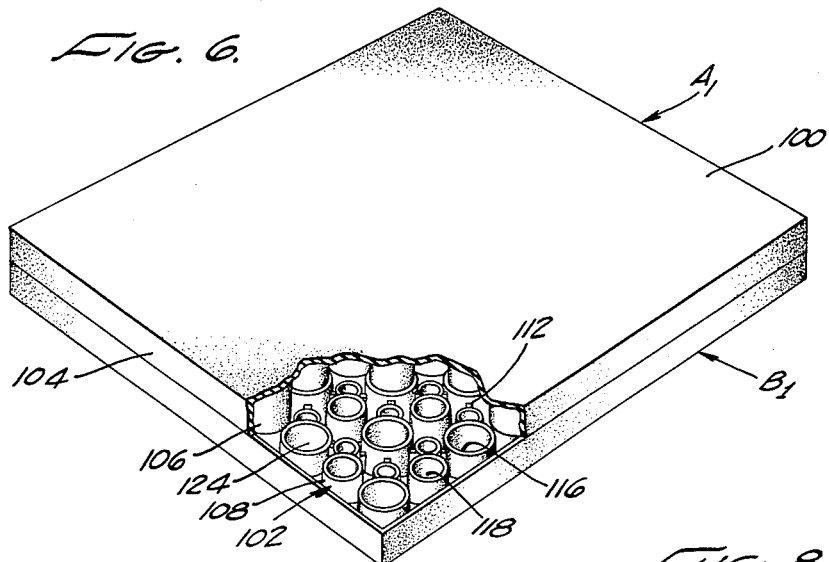
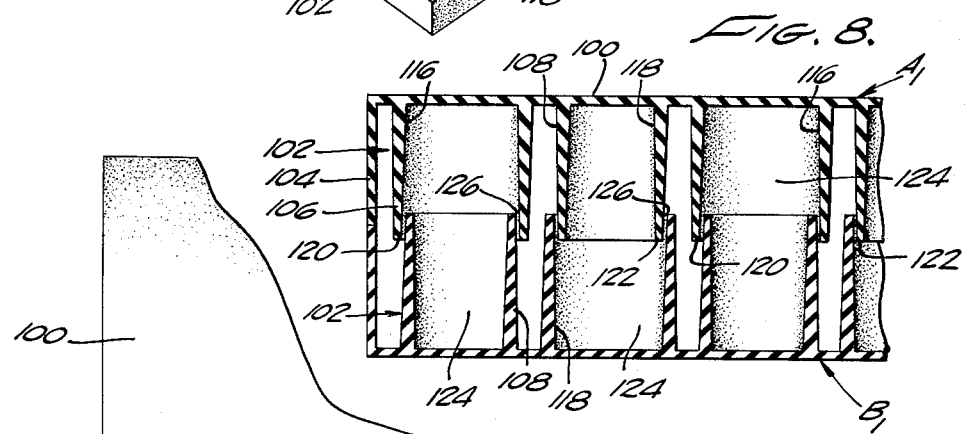
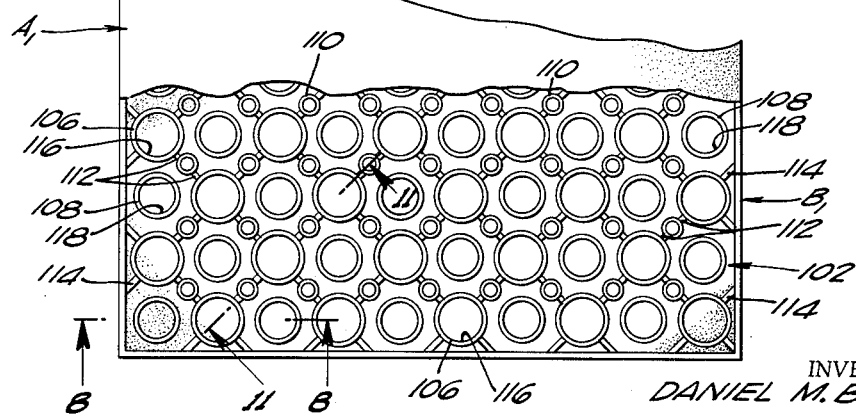
INVENTOR.
DANIEL M. BURKE
BY
Beehler & Arant
ATTORNEYS May 17, 1966   D. M. BURKE   3,251,076
IMPACT ABSORBING MAT
Filed March 19, 1965   5 Sheets-Sheet 3

INVENTOR.
DANIEL M. BURKE
BY Beehler & Arant
ATTORNEYS

May 17, 1966  D. M. BURKE  3,251,076
IMPACT ABSORBING MAT
Filed March 19, 1965  5 Sheets-Sheet 4

INVENTOR.
DANIEL M. BURKE
BY Beehler & Arant
ATTORNEYS

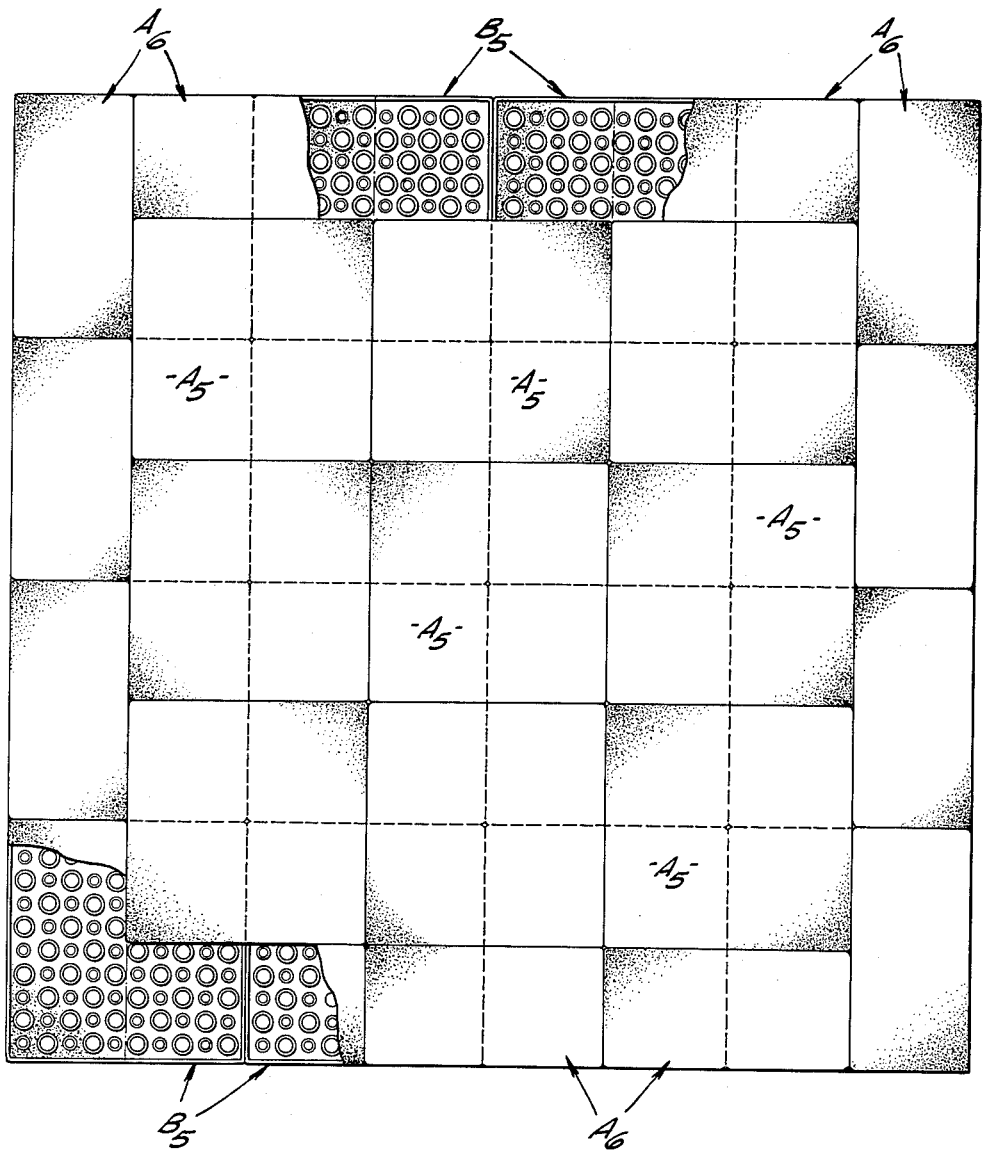

United States Patent Office 3,251,076
Patented May 17, 1966

3,251,076
IMPACT ABSORBING MAT
Daniel M. Burke, 14802 E. Tacuba Drive,
La Mirada, Calif.
Filed Mar. 19, 1965, Ser. No. 444,917
20 Claims. (Cl. 5—351)

The present application is a continuation-in-part of my copending application, Serial No. 94,796, filed March 10, 1961, and entitled, Impact Absorbing Mat, which is now abandoned.

This invention relates generally to impact absorbing or cushioning devices and has more particular reference to impact cushioning mats.

Stated generally, the purpose of all impact cushioning or absorbing devices is to retard or arrest a moving body without damage or injury to the body. This, in turn, requires absorption or dissipation of the kinetic energy of the body at a rate such that the resulting maximum arresting force produced on the body, in opposition to its motion, is below the threshold level of force at which the body will incur damage or injury. The magnitude of this arresting force, of course, is directly related to the rate at which the kinetic energy of the impacting body is absorbed or dissipated. Accordingly, a reduction in the rate of energy absorption or dissipation occasions a corresponding reduction in the magnitude of the force. To be effective, then, an impact cushioning device must be capable of sufficient yieldable deformation to absorb all of the kinetic energy of the impacting body and must be so designed that the rate at which such energy is absorbed or disspiated is sufficiently low to maintain the magnitude of the arresting force below the injury or damage threshold level of the impacting body.

Impact cushioning devices may be characterized as either predominantly elastic or predominantly non-elastic. A predominantly elastic impact cushioning device is one which produces a predominantly elastic arresting force on an impacting body. In this type of cushioning device, the kinetic energy of the impacting body is stored, in effect, in the device during the course of the impact. When the forward motion of the body has been arrested, the elastic stresses in the device return it to its normal state. The cushioning device, thereby, imparts to the impacting body, in the opposite direction, a velocity component which is less than the forward velocity of the body at the time of impact by an amount related to the energy losses which occur during deformation of the cushioning device and its subsequent return to its normal state. A predominantly elastic impact cushioning device, then, causes rebound of the impacting body and, for this reason, is unsatisfactory for use in any application where such rebound is not desirable.

A predominantly non-elastic impact cushioning device is one which produces a predominantly non-elastic arresting force on an impacting body. In this type of impact cushioning device, the kinetic energy of the impacting body is dissipated, and not stored in the device, so that no rebound of the body occurs when its forward motion is arrested. Crash helmets, seat belts, and other similar impact cushioning devices utilize this type of non-elastic impact cushioning action. An impact cushioning device which is purely non-elastic in its action, then, is a "one shot" device, as it were, which must be replaced or reconditioned after each use. Accordingly, such purely non-elastic impact cushioning devices are not satisfactory for use in applications which require automatic restoration of the cushioning devices to their original state after each impact, thereby to immediately condition the devices for the next impact. For these reasons, effectively non-elastic impact cushioning devices have been devised which embody, in addition to the non-elastic impact cushioning means, secondary elastic means which undergo elastic deformation during impact and, after impact, restore the impact cushioning devices to their original state.

It is a general object of this invention to provide an improved dual action impact cushioning mat which exhibits an effectively impact cushioning action during impact and subsequent elastic restoration to its original state following impact, whereby the mat is capable of repeated use.

Dual action impact cushioning mats of this general type capable of repeated use have been devised in the past, of course. Many of these prior mats, however, are deficient in that they tend to produce excessive rebound of the impacting body. Thus, in a dual action impact cushioning mat of the type under discussion, the secondary elastic restoration means inherently absorbs and stores some of the kinetic energy of an impacting body, and, accordingly, tends to cause rebound of the body following impact. If a substantial portion of the kinetic energy of an impacting body is absorbed by the secondary elastic restoration means, the mat may produce substantial rebound of the impacting body following the impact. On the other hand, if most of the kinetic energy of the impacting body is dissipated by the primary non-elastic impact cushioning action of the mat, and the kinetic energy which is absorbed by and stored in the secondary elastic restoration means during impact is sufficient merely to restore the mat to its original state after impact, the mat will exhibit little, if any, rebound tendency. It is apparent at this point, therefore, that one measure of the rebound tendency of a dual action impact cushioning mat is the ratio of the kinetic energy of an impacting body which is absorbed by and stored in the secondary elastic restoration means of the mat during impact to the kinetic energy of the impacting body which is dissipated during the impact by the primary non-elastic impact cushioning action of the mat. Many of the existing dual action impact cushioning mats, then, are deficient for the reason that the rebound tendency ratio of these mats is relatively high. In addition, many of the existing dual action impact cushioning mats exhibit an excessively high rate of energy absorption or dissipation and, therefore, are useful only for arresting impacting bodies capable of withstanding relatively large arresting forces. The maximum yieldable deformation of many of the existing mats, and hence their maximum impact energy level, are also limited.

Another object of this invention is to provide improved dual action impact cushioning mats of the character described wherein the ratio of elastic energy absorption to non-elastic energy dissipation, during impact of the mats by an impacting body, is just sufficient to restore the mats to their original state after each impact without producing rebound of the impacting body, and wherein further, even the elastic restoration of the mats to their original state is damped to further minimize the possibility of rebound.

A further object of the invention is to provide improved dual action impact cushioning mats of the character described which possess a sufficient degree of yieldable deformation to absorb relatively high energy impacts, and which are so constructed as to exhibit a relatively low rate of energy dissipation, whereby the present mats are suitable for arresting impacting bodies, such as the human body, having a relatively low injury or damage threshold.

In connection with this latter object of the invention, one important use of the present impact cushioning mats involves their placement on school playground areas, and other similar areas to provide protective covering over the relatively hard surfaces of these areas. For this particular use, an impact cushioning mat must exhibit, in addition to the desirable impact cushioning characteristics noted earlier, a relatively uniform resisting force or pressure over the entire impact area. Thus, when a child falls from a piece of playground apparatus onto an impact cushioning mat, the back pressure from the mat should be kept relatively uniform over all of the portions of his body, which come in contact with the mat. Moreover, this back pressure should remain relatively uniform throughout the impact interval.

A still further object of the present invention is to provide impact cushioning mats which are ideally suited for use as protective coverings on playground areas and the like, and which are uniquely constructed to produce on an impacting body an arresting force or pressure which is relatively uniform over substantially the entire impact area and remains relatively uniform throughout the impact interval.

A further object of the invention is to provide dual impact cushioning mats of the character described which are relatively simple in construction, economical to fabricate, easy to assemble and install, immune to damage and wear, and are otherwise ideally suited to their intended purposes.

Other objects, advantages, and features of the invention will become readily evident as the description proceeds.

Briefly, the objects of the invention are attained by providing dual action impact cushioning mats composed of first and second integrally formed resilient members each having a substantially flat base or wall portion and a plurality of cell wall sections extending transversely from one side of the respective base portion. In the finished mats, these resilient members are assembled in parallel relationship with the cell wall sections thereof in mutual interengagement so as to define in the region between the opposing base portions of the members, a plurality of fully enclosed separate air cells disposed in a common plane between and parallel to the base portions. The cell wall sections of the members are so constructed as to define, when thus interengaged, vent passage means associated with each cell through which air is expelled from the respective cell during contact of an adjacent portion of the mat by an impacting body. Thus, during such impact the adjacent interengaging cell wall sections undergo telescopic contraction which expels air from the respective air cells through the corresponding vent passage means. These vent passage means restrict the discharge of air from the air cells in such a way that the mat exhibits a predominantly non-elastic cushioning action.

During each impact, the resilient members of the present mats undergo elastic deformation which creates elastic stresses in the members. After impact, these elastic stresses return the mats to their original state, thereby to condition the mats for the next impact. The mats, therefore, are capable of repeated use. One unique and particularly beneficial feature of the present mats resides in the fact that the ratio of the kinetic energy of an impacting body which is absorbed by and stored in the resilient members of the mats during an impact to the kinetic energy of the impacting body which is dissipated by the non-elastic cushioning action occasioned by expulsion of air from the adjacent air cells of the mats through their respective restricted vent passage means is relatively low, and just sufficient to effect restoration of the resilient members to their original state after impact. Accordingly, the present mats produce little if any rebound of an impacting body. The rebound tendency of the present mats is further minimized by the fact that elastic restoration of the resilient members of the mats is damped by the restricted return air flow into the air cells of the mat after impact.

According to one refinement of the invention, the interengaging cell wall sections on the resilient members of the mats are so constructed that the effective area of the vent passage means for each air cell is progressively diminished during an impact, whereby the mats exhibit a progressively increasing arresting force on an impacting body. According to a further refinement of the invention, the interengaging cell wall sections are stepped, roughened, or provided with interengaging helical ribs and grooves for effecting a regulated increase in the elastic energy absorption which occurs in the mats during impact.

Certain presently preferred embodiments of the invention will now be described in detail by reference to the attached drawings, wherein:

FIGURE 1 is a vertical section through an impact cushioning mat according to the invention;

FIGURE 2 is a section taken on line 2—2 in FIGURE 1;

FIGURE 3 is a section taken on line 3—3 in FIGURE 1;

FIGURE 4 is a section taken on line 4—4 in FIGURE 1, and showing the mat in its normal state;

FIGURE 5 is a view similar to FIGURE 4 illustrating the mat in the compressed state which it assumes during an impact;

FIGURE 6 is a perspective view, partially broken away, of a modified impact mat according to the invention;

FIGURE 7 is a slightly enlarged plan view of the mat in FIGURE 6, with the upper resilient member of the mat broken away;

FIGURE 8 is an enlarged section taken on line 8—8 in FIGURE 7 and showing the mat in its normal state;

FIGURE 19 illustrates one manner of assembling, in interlocked relation, several impact cushioning mats of the invention.

Figure 9:
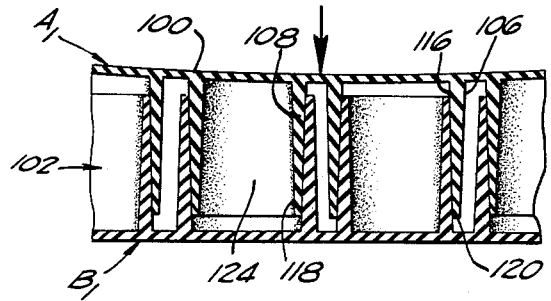
FIGURE 9 is a view similar to FIGURE 8 after partial compression of the mat following an impact.

Referring now to the drawing and particularly FIGURES 1–4 thereof it will be seen that a first resilient member A forms the upper part of the mat structure while a second resilient member B forms the lower part. Member A has a substantially flat base portion 10 which forms the upper wall of the mat, and an integrally formed rib structure which extends downward from the underside of base portion 10. This rib structure includes a plurality of cell wall sections 11 each of which is of circular configuration as viewed in the horizontal plane.

Member B also has a rib structure extending upwardly from the upper surface of its flat base portion 40. This rib structure consists of a plurality of cell wall sections 41 and a plurality of cell wall sections 52. Whereas the cell wall sections 11 of member A are separate and completely isolated from each other the cell wall sections 41, 52 of member 52 are interconnected to form a continuous structure.

As best seen in FIGURE 1 the thickness of cell wall sections 11 is tapered in a vertical direction. The upper part 12 which is nearest the base portion 10 has maximum thickness, while the lower part 13 representing the lower extremity of the cell wall section has minimum thickness. The vertical cross-section of each cell wall 11 has the configuration of a truncated triangle. The interior surface 14 is therefore a truncated conical surface and the exterior surface 15 is likewise of a truncated conical shape. The flat lower end surface of each cell wall section 11 is designated 16 and is parallel to base portion 10.

Each of the cell wall sections 11 of member A provides a separate cavity within its confines, these cavities being arrayed in rows in a symmetrical configuration as best seen in FIGURE 2. Thus in FIGURE 2 there appear an upper row of cell wall cavities 20, 21, 22, a middle row of cell wall cavities 23, 24, 25, 26, and a lower row of cell wall cavities 27, 28, 29. Each cavity of the middle row is equally spaced from two adjacent cavities of the lower row. Thus, for example, cell wall cavities 20, 24, and 28 are in a straight line. It will be seen that cavities 20, 21, 25, 28, 27, and 23 form a perfect hexagonal structure which characterizes the entire cell wall arrangement.

In member B the cell wall sections 41, 52 also provide a uniform hexagonal arrangement of separate cavities. As shown in FIGURE 3 an upper row of these cell wall cavities are identified as 27', 28', 29', a middle row as 23', 24', 25', 26', and a bottom row as 20', 21', 22'. Each of the cavities of member B is adapted to receive a corresponding one of the circular cell wall sections 11 of member A so as to provide a fully enclosed air cell. Thus, for example, cell wall cavity 20' of member B receives the cell wall section 11 that encloses cavity 20 of member A, forming an enclosed air cell which is smaller than cavity 20; but equal in size and shape to the formerly open cell cavity 20. For convenience, the air cells which appear in the drawings are hereinafter referred to by the reference numerals 20-29 applied to the cell wall cavities in FIGURE 2.

As best seen in FIGURE 3 the numeral 41 is employed to designate each cell wall section that lies directly between two adjacent cell wall cavities of member B. As may be seen in FIGURE 1 each cell wall section 41 has a vertical cross-sectional configuration which, except for being inverted, is identical to that of cell wall section 11, the parts numbered 42–46 corresponding to parts 12–16, respectively. However, it will be noted that both of the surfaces 44 and 45 are interior surfaces, there being no exterior cell wall surfaces in the structure of member B.

Again referring to FIGURE 3 it will be seen that the numeral 52 is employed to designate the cell wall section lying centrally between three of the cells of member B. In each of the cell wall sections 52 at its outer end, adjacent the end surfaces 46, a portion of the material is removed at 53 to avoid excess rigidity of the wall. Each cell wall cavity 20', 29', etc. of member B has a conically shaped interior wall adapted to receive one of the cell wall sections 11 in relatively tight engagement with the exterior surface 15 thereof.

Each of the resilient members A and B has a set of six openings circumferentially spaced about the cell wall of each of its cell wall cavities. When the members A and B are intermeshed to provide the complete mat structure each air cell has a double circumferential wall, of which the inner wall is provided by member A while the outer wall is provided by member B. The cell wall openings of members A and B are aligned with each other so as to provide an air passageway between each two adjacent air cells.

With reference to member A as seen in FIGURE 2 an opening in cell wall 11 of cell 20 is identified as 20–24 since it is aligned with the center of air cell 24. A similar opening in cell wall 11 of air cell 24 is identified as 24–20. In member B as seen in FIGURE 3 a single opening identified as 20'–24' provides communication between air cells 20' and 24'. Thus in the assembled mat structure the three openings 20–24, 20'–24' and 24–20 are aligned to provide an air passageway between the enclosed air cells 20 and 24.

In FIGURE 1 the numeral 59 identifies a point at which exterior surface 15 of cell wall section 11 and end surface 46 of cell wall section 41 come together, immediately adjacent base portion 10 of member A, when the mat structure is in its assembled form. The locus of this point as it appears in FIGURE 3 is illustrated by dotted lines, also identified as 59.

With reference to FIGURE 1 it will be seen that each cell wall opening of member A consists of a horizontally extending round hole 51 and a slit 52 extending downwardly therefrom. Hole 51 is above the vertical center of cell wall 11, being about twice as far from lower end surface 16 as it is from the under surface of base portion 10. Slit 52 extends all the way from hole 51 to the lower end surface 16. In member B the openings are made in the same manner, with hole 55 corresponding to hole 51 and slit 56 corresponding to slit 52. In the assembled form of the mat the hole and slit arrangements of member B are inverted with respect to those of member A.

It will be seen that the vertical thickness of base portions 10 and 40 is rather small compared to the total thickness of the mat. For school playground usage, for example, the total thickness of the mat is preferably about 2". Base portions 10 and 40 then have a thickness of about ¼", and the vertical height of each air cell is about 1½".

In response to an impact the cell walls have some tendency to buckle and also to become thickened in the horizontal direction. The cell walls of the members A and B also have a tendency to slide vertically relative to each other. An impacted air cell initially finds an easy egress for air in all directions since each hole 51 on the air cell inner surface is aligned with a similar hole 51 of an adjoining cell and a slit 56 of an intervening wall 41. Also, each slit 52 is aligned with another slit 52 and an intervening hole 55. However, as the indentation of the impacted air cell progresses a point is reached where the holes 51 communicate through the hole 55, and then a further point is reached where the passageway is completely shut off. Air pressure builds up within the air cell and bottoming is prevented.

After maximum indentation of the impact area has occurred, the elastic stresses then existing in the deformed resilient members A and B restore the members to their normal undistorted condition of FIGURE 1, whereby air is drawn back into the compressed air cells. The return flow of air meets with increased resistance, however, since each of the slits 52 and 56 is opened up in a particular direction when the impact first occurs, and to some extent provides a trap that resists the return flow of air. Therefore, the return flow of air extends over a substantially greater period of time than the original outflow, and the tendency of the impacted portion of the mat structure to produce rebound of the falling body is eliminated or greatly minimized.

In the preceding discussion it has been assumed that the interior of the mat structure normally contains air at atmospheric pressure. It may, however, be desirable to provide a closed system in which the interior pressure is raised above the atmospheric level. The advantages of such a pressurized system are that the quantity of material for constructing the mat is reduced, and the ability of the mat to carry static loads is increased. Response of the mat structure to an impact is still generally the same as in a non-pressurized system.

While a hexagonal cell arrangement has been illustrated herein it is nevertheless believed that a square pattern is equally advantageous if not more so. That is, the circular air cells may be arranged in a uniform pattern of vertical and horizontal rows. A circular air cell configuration is preferred but is not absolutely essential in carrying out the purposes of the invention. It is also preferred to utilize a double circumferential cell wall but this feature is likewise not absolutely necessary.

Reference is now made to FIGURES 6-11 illustrating a modified impact cushioning mat according to the invention. This mat comprises an upper resilient member $A_1$ and a lower resilient member $B_1$ which are identical. Accordingly, corresponding elements of the two members are designated by the same reference numerals. Moreover, only one of the members, the upper member $A_1$ will be described in detail, since it is obvious that such a description will apply as well to the lower member $B_1$.

The upper resilient member $A_1$ has an upper generally flat wall or base portion 100 and a rib structure 102 formed integral with an depending below the under side of the base portion. Along the edges of the base portion are depending walls or flanges 104. Rib structure 102 includes a multiplicity of first annular cell wall sections 106, second annular cell wall sections 108, and annular supporting posts 110. The cell wall sections 106 and 108, as well as the supporting posts 110 are shown to be circular in transverse cross-section. The cell wall sections 106 are larger in diameter than the wall sections 108. Each cell wall section 106 and 108 is axially tapered both internally and externally, in the same manner as the cell wall sections 11 in FIGURES 1-5. Each cell wall section, therefore, diminishes in radial thickness from its upper extremity to its lower extremity and has conically tapered internal and external surfaces like the earlier cell wall sections. As shown in FIGURE 7, the cell wall sections 106 and 108 are arranged in a symmetrical pattern of first parallel rows extending parallel to two opposite sides of the mat and second parallel rows extending parallel to the remaining sides of the mat. The cell wall sections in each row alternate and the wall sections in adjacent parallel rows are staggered in such manner that each large wall section 106 in a given row is aligned laterally of the row, with a pair of small cell wall sections 108 in the two adjacent rows, respectively. Similarly, each small cell wall section 108 in a given row is aligned with a pair of large cell wall sections 106 in the two adjacent rows, respectively. At this point, it is significant to note that at least the rows of cell wall sections which extend in one direction of the mat, such as the horizontal rows in FIGURE 2, terminate at one end in a large cell wall section 106 and at the other end in a small cell wall section 108. The reason for this will be explained presently. The supporting posts 110 are also arranged in a symmetrical pattern of first parallel rows which extend parallel to two opposite sides of the mat and second parallel rows which extend parallel to the remaining sides of the mat. Each of these rows of supporting posts is located mid-way between two adjacent rows of the cell wall sections 106, 108. The supporting posts 110 in each post row are staggered relative to the cell wall sections in the two adjacent rows of cell wall sections, in such manner that the axis of each supporting post extends approximately along the intersection of a first plane containing the axes of the two adjacent large wall sections 106 and a second plane containing the axes of the two adjacent small cell wall sections 108. Each supporting post 110 is joined to its two adjacent large cell wall sections 106 by ribs 112 which are located in a plane containing the axes of the latter wall sections and supporting posts. The large cell wall sections 106 adjacent the side walls or flanges 104 are joined to these flanges by ribs 114.

The large cell wall sections 106 each define a cavity 116 of generally frusto-conical shape which opens through the lower end of the respective wall section. Similarly, each small cell wall section 108 defines a generally frusto-conical cavity 118 which opens through the lower end of the respective wall section. As shown in FIGURE 8, the lower extremities of the cell wall sections 106 and 108 project a short distance below the lower edges of the side walls or flanges 104 of the resilient member $A_1$ and terminate in annular lower end faces 120 and 122 respectively, which are located approximately in a common plane parallel to the base portion 100 of the latter member. It is also significant to note in FIGURE 8, that the internal diameter of the lower end of the cavity 116 defined by each large cell wall section 106 is slightly greater than the external diameter of each small cell wall section 108 adjacent the lower end of the latter wall section.

Figure 11:
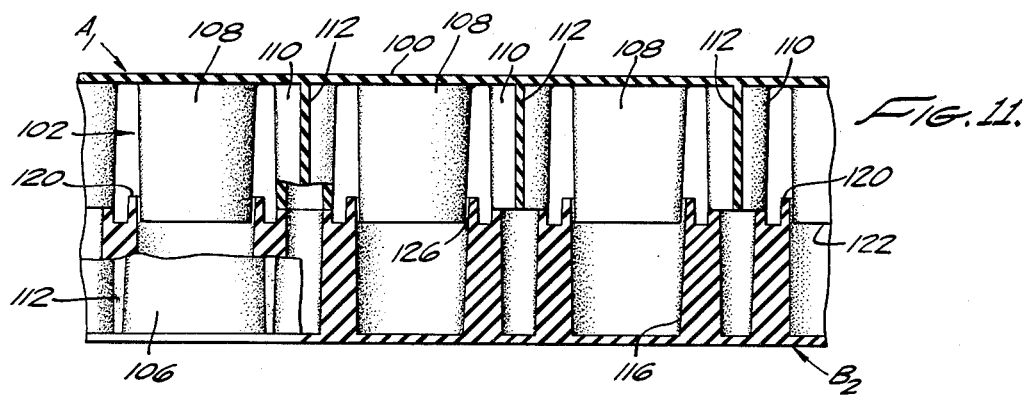
FIGURE 11 is an enlarged section taken on the line 11—11 in FIGURE 7.

All of the supporting posts 110 have the same diameter and length. As shown in FIGURE 11, the length of the supporting post is somewhat less than the length of the cell wall sections 106 and 108. Actually, the lower annular end faces of the supporting posts are located in the common plane of the lower edge surfaces of the side walls or flanges 104 on the member $A_1$.

As mentioned earlier, the lower resilient member $B_1$ is identical to the resilient member $A_1$ described above. It is apparent, therefore, that the two resilient members may be assembled, one on top of the other, in the manner illustrated in FIGURE 8. When thus assembled, the side walls or flanges 104 and supporting posts 110 of the upper member $A_1$ rest on the flanges and posts, respectively, of the lower member. The cell wall sections 106 and 108 on the two members are telescopically interengaged, as shown in FIGURE 8. Thus the upper extremity of each small cell wall section 108 on the lower member $B_1$ extends a short distance into the lower end of the cavity 116 defined by one of the large cell wall sections 106 on the upper member $A_1$. Similarly, the lower extremity of each small cell wall section 108 on the upper member extends a short distance into the upper end of the cavity 116 defined by one of the large cell wall sections 106 on the lower member. Each pair of telescopically interengaged cell wall sections define a fully enclosed air cell 124 and a restricted annular vent passage 126 communicating the respective air cell to the interior space of the mat about the cell wall sections.

During an impact on any part of the impact cushioning mat illustrated in FIGURES 6-11, the abutting supporting posts 110 in the vicinity of the impact area undergo elastic deformation or compression. The adjacent interengaging cell wall sections 106 and 108 are telescopically contracted in the manner shown in FIGURE 9 and the corresponding air cells 124 are compressed. Air is thereby expelled from the compressed air cells through the respective annular vent passages 126, into the interior space of the mat about the cell wall sections. Owing to the fact that the effective area of the vent passages 126 is relatively small, however, the rate at which air can escape from the impacted cells is restricted whereby the air in these cells is compressed.

Figure 10:
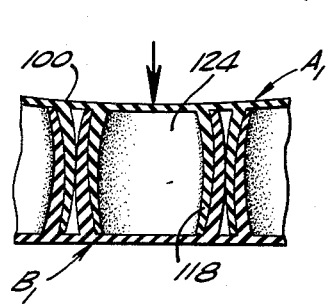
FIGURE 10 is a view similar to FIGURE 9 illustrating the mat after further compression thereof.

Accordingly, the impact cushioning mat produces an arresting force on the impacting body which is developed, in part, by elastic deformation of the supporting posts 110 and, in part, by compression of the air in the air cells 124. The initial magnitude of the arresting force and the components of the arresting force contributed by deformation of the supporting posts and compression of the air cells, respectively, can be regulated by varying the diameter of the posts and the effective area of the air cell vent passages. If the energy of the impacting body is sufficient, deformation of the cushioning mat may continue beyond the point where the cell wall sections 106, 108 are telescopically contracted to their limit. When this occurs, the cell wall sections themselves are elastically compressed and deformed, as shown in FIGURE 10, and thereby produce an additional arresting force component.

If desired, the cell wall sections 106 and 108 may be cylindrically shaped to maintain a constant vent passage area as these wall sections undergo telescopic contraction during impact. In this case, the component of the arresting force contributed by compression of each air cell 124 rises to some initial level immediately following impact and remains approximately at this level during subsequent telescopic contraction of the cell wall sections to their limit. According to the preferred practice of the invention, however, the cell wall sections are axially tapered, as shown and described, to progressively reduce the effective area of the vent passages 126 as telescopic contraction of the wall sections proceeds during impact. Under these conditions, the component of arresting force contributed by each air cell continues to progressively increase as the respective telescopically engaging cell wall sections 106, 108 contract to their limit.

In either case, continued compression of an air cell 124 during impact eventually closes completely its respective vent passage 126. Continued comparison of the air cell then causes a sharp increase in the pressure of the trapped air within the cell and, thereby, a corresponding increase in the force component produced by the cell.

Following the impact, the elastic stresses existing in the elastically deformed portions of the mat, i.e. the cell wall sections 106, 108 and/or the supporting posts 110 restore the mat to its original or normal condition of FIGURE 6. The elastic return of the mat to its original condition re-expands the air cells 124. Accordingly, air is drawn back into the air cells. It is significant to note, however, that the vent passages 126 also restrict the rate of return air flow to the cells following impact and, thereby, the rate of return of the mat to its original condition.

It is apparent at this point, therefore, that during an impact the major portion of the energy of the impacting body is dissipated by expulsion of the air from the compressed air cells 124, through the restricted air cell vent passages 126, into the interior of the mat about the cell wall sections 106, 108. A minor portion of the energy of the impacting body is absorbed by and thereby stored in the elastically deformed portions of the mat. The elastic stresses created in these elastically deformed portions of the mat return the mat to its original condition following the impact. The mat is so designed that the amount of energy of the impacting body which is stored in the elastically deformed portions of the mat during impact is relatively small in comparison to the energy that is dissipated by compression of the air cells 124 and is sufficient merely to return the mat to its original condition following impact. This restricted energy absorption in the mat in conjunction with the restricted return air flow to the air cells 124 result in an impact cushioning mat which produces little if any rebound of the impacting body following impact. It is apparent, of course, that the impact cushioning characteristics of the mat may be varied by changing the relative dimensions of the cell wall sections 106, 108 and the supporting posts 110.

Figure 12:
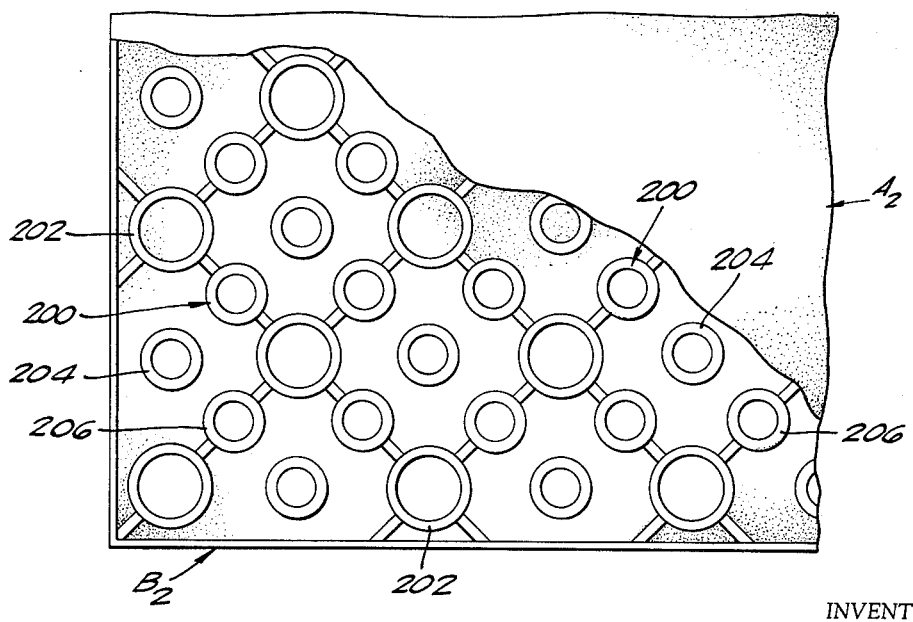
FIGURE 12 is a plan view of the further modified impact cushioning mat according to the invention, with a portion of the upper resilient member of the mat broken away.

In the impact cushioning mat just described, the small cell wall sections 108 and the supporting posts 110 are of different diameters. This is not necessary, however. Thus, FIGURE 12 illustrates a modified impact cushioning mat according to the invention which is identical to the impact cushioning mat just described except that the small cell wall sections and supporting posts of the mat in FIGURE 12 have the same diameter. In FIGURE 12, the upper and lower resilient members of the illustrated mat are designated by the reference characters $A_2$ and $B_2$. The large cell wall sections, small cell wall sections, and supporting posts which make up the integral rib structure 200 on each resilient member are designated by the reference numerals 202, 204, and 206, respectively. It will be noted that the small cell wall sections 204 and the supporting posts 206 have the same diameter, as just noted.

Figure 13:
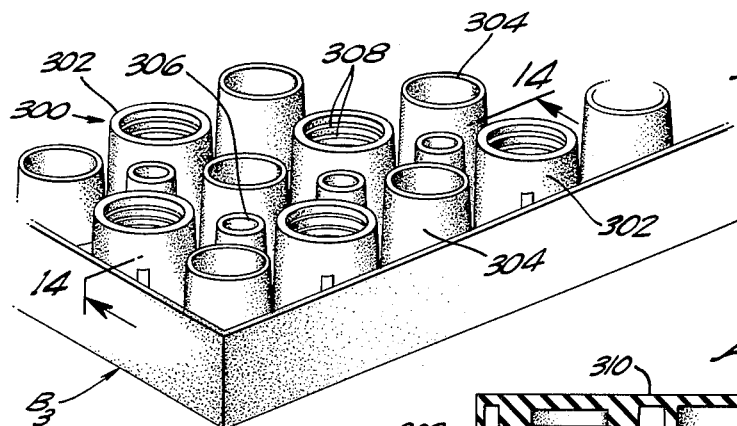
FIGURE 13 is a perspective view of one resilient member of a still further modified impact cushioning mat according to the invention.
Figure 14:
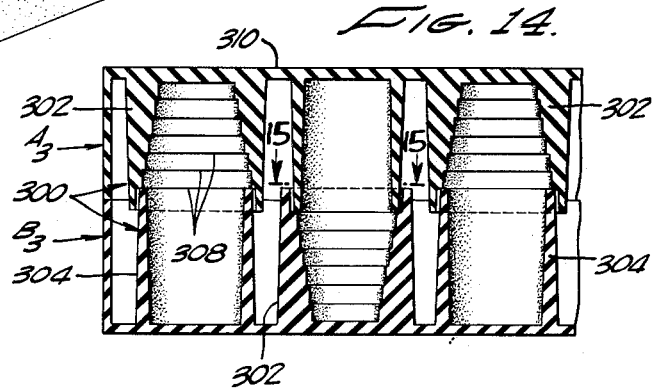
FIGURE 14 is an enlarged section taken along line 14—14 in FIGURE 13 and illustrating the upper resilient member of the mat installed on the lower resilient member shown in FIGURE 13.
Figure 15:
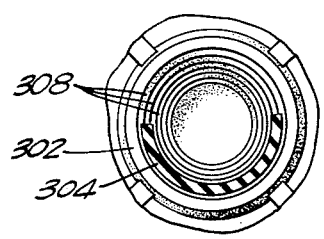
FIGURE 15 is a section taken on line 15—15 in FIGURE 14.

FIGURES 13-15 illustrate a further modified impact cushioning mat according to the invention which is identical to the impact cushioning mat of FIGURES 6-11 except for the differences noted below. In FIGURES 13-15, the upper and lower resilient members of the mat are designated by the reference characters $A_3$ and $B_3$. The relatively large cell wall sections, relative small cell wall sections, and supporting posts which comprise the integral rib structure 300 of each of these resilient members are designated by the reference numerals 302, 304, and 306, respectively. The sole difference between the impact cushioning mat of FIGURES 6-11 and the mat of FIGURES 13-15 resides in the fact that in the latter mat, the large cell wall sections 302 are internally conically stepped in the manner best illustrated in FIGURE 14, to define within each large cell wall section a plurality of annular axially presented shoulder surfaces 308 which progressively diminish in diameter toward the base portion 310 of the respective resilient member.

When the impact cushioning mat, under discussion, occupies its normal condition of FIGURE 14, each small cell wall section 304 engages the outermost shoulder 308 of its respective interengaging large cell wall section 302. When the mat is subjected to an impact, the interengaging cell wall sections 302, 304 undergo telescopic contraction, as described earlier in connection with the impact cushioning mat of FIGURES 6-11. In the mat of FIGURES 13-15, however, when a pair of interengaging cell wall sections 302, 304 undergo telescopic contraction, the inner, small cell wall section 304 moves in step-wise fashion from one of the shoulders 308 on its respective large cell wall section 302 to the next shoulder. Simultaneously, the inner cell wall section is radially compressed. This step-wise telescopic contraction and radial compression which occurs in the interengaging cell wall sections 302, 304 during impact, introduce additional energy losses during impact which are effective to dissipate the energy of the impacting body. In this way, the impact cushioning ability of the mat in FIGURES 13-15 may be enhanced without increasing the rebound tendency of the mat. In other words, increasing the frictional losses which occur in the impact cushioning action of a mat increases the total impact energy which may be cushioned by the mat without increasing the component of the impact energy which is absorbed by elastic deformation of the resilient members of the mat.

Figure 16:
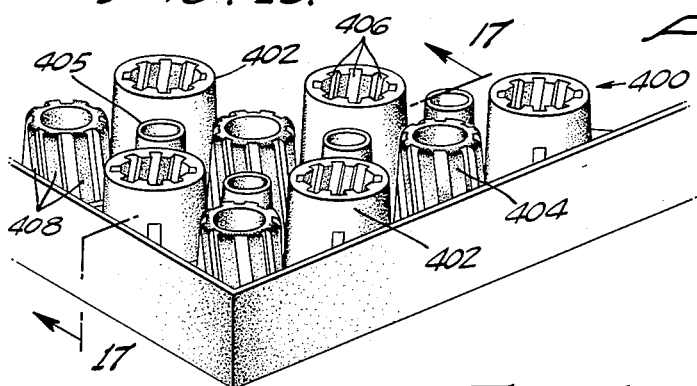
FIGURE 16 is a perspective view of the lower resilient member of still a further modified impact cushioning mat according to the invention.
Figure 17:
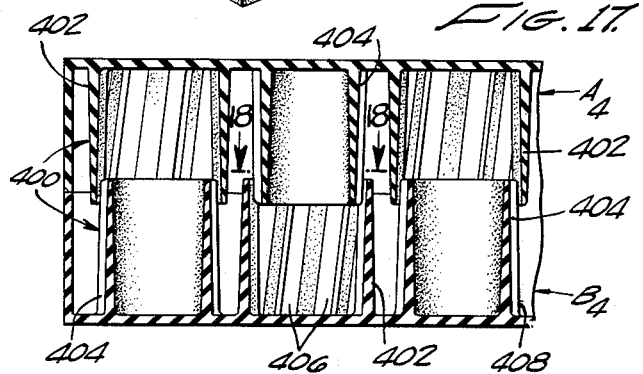
FIGURE 17 is an enlarged section taken on line 17—17 in FIGURE 16 with the upper resilient member of the mat installed on the lower resilient member shown in FIGURE 16.
Figure 18:
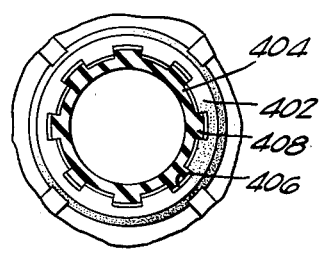
FIGURE 18 is a section taken on line 18—18 in FIGURE 17.

FIGURES 16-18 illustrate a further modified cushioning mat according to the invention which is identical with the impact cushioning mat just described except for the type of impact energy dissipating means employed in the mat. In FIGURES 16-18 the resilient members of the mat are designated by the reference characters $A_4$ and $B_4$. The relatively large cell wall sections, relatively small cell wall sections, and supporting posts which comprise the integral rib structures 400 of the resilient members $A_4$ and $B_4$ are designated by the reference numerals 402, 404, and 405. In the mat under consideration, each large cell wall section 402 is internally formed with a plurality of circumferentially spaced, axially extending, generally helically inclined grooves 406. Each small cell wall section 404 is externally formed with a plurality of circumferentially spaced, axially extending generally helically inclined ribs 408 which complement the grooves 406 in its respective telescopically interengaging large cell wall section 402. When the members $A_4$, $B_4$ of the impact cushioning mat are assembled, in the manner illustrated in FIGURE 17, the ribs 408 on each small cell wall section 404 engage in the grooves 406 in its respective large cell wall section 402. When the mat of FIGURES 16-18 is subjected to an impact, the interengaging cell wall sections 402, 404 undergo telescopic contraction, as in the earlier forms of the invention. In the impact cushioning mat under consideration, however, the interengaging grooves 406 and ribs 408 tend to relatively twist the interengaging cell wall sections 402, 404 as the latter wall sections contract during impact. This twisting of the cell wall sections creates both an energy loss which dissipates the energy of the impacting body and an elastic deformation in the cell wall sections which increases the arresting force imposed by the impact cushioning mat on the impacting body.

It is significant to note that in the impact cushioning mat of FIGURES 13–15 and the mat of FIGURES 16–18 annular vent passages exist between the respective telescopically engaging cell wall sections 302, 304, and 402, 404, respectively, through which air is expelled from the air cells of the mats during impact and through which the air returns to the air cells during subsequent restoration of the mats to their original condition following impact.

In many, if not most, applications of the present impact cushioning mats, the area to be covered is substantially greater than the area of one mat. In this case, it becomes necessary to cover the area with several mats placed side by side and to interlock the mats in some way. In the impact cushioning mats illustrated in FIGURES 6–18, the upper and lower resilient members of the mats are aligned. When this type of mat assembly is utilized, and an area is covered by several mats placed side by side, some external means must be employed for interlocking the adjacent mats. FIGURE 19 illustrates an alternative manner in which the upper and lower resilient members of a number of impact cushioning mats according to the invention may be assembled to accomplish interlocking of the adjacent mats. In FIGURE 19, the upper resilient members of the mats are designated by the reference characters $A_5$ and the lower resilient members of the mats are designated by the reference characters $B_5$. These upper and lower resilient members may be constructed in any of the ways illustrated in FIGURES 6–18.

When assembling the impact cushioning mats according to FIGURE 19, the upper and lower resilient members of the mats are staggered, in the manner illustrated, so that each upper member $A_5$ overlies the four adjacent corners of four adjacent lower members $B_5$, thereby to interlock these four lower members. Similarly, each lower member $B_5$ interlocks four adjacent upper members $A_5$.

It is apparent, of course, that when a number of resilient members $A_5$ and $B_5$, comprising a resilient impact cushioning mat structure according to the invention are assembled in the manner illustrated in FIGURE 19, the lower resilient members $B_5$ will project beyond the sides of the upper resilient members $A_5$, along each side of the mat assembly. According to the invention, these narrow projecting portions of the underlying resilient members are covered by narrow resilient members $A_6$ which are identical to the resilient upper members $A_5$ except as to their dimensions.

It is apparent, therefore, that the invention herein described and illustrated is fully capable of attaining the several objects and advantages preliminarily set forth.

While certain preferred embodiments of the invention have been described and illustrated for illustrative purposes various modifications in the design, arrangement of parts, and instrumentalities of the invention are possible within the spirit and scope of the following claims.

What is claimed as new in support of Letters Patent is:

1. An impact absorbing mat comprising first and second integrally formed resilient members, each of said resilient members having a substantially flat base portion and a rib structure extending perpendicularly outward from one side thereof, each of said rib structures including cell wall sections which circumferentially enclose a plurality of separate cells lying in a common plane parallel to the respective base portion, said cell wall sections having circumferentially spaced openings therein; said first and second resilient members being adapted to be placed in substantially parallel relationship, with said rib structures thereof in mutual engagement so as to fully enclose a plurality of separate air cells lying in a common plane between said base portions of said members, each of said air cells having a double circumferential cell wall of which the inner portion is provided by the cell wall sections of one of said members and the outer portion is provided by the cell wall sections of the other of said members, the cell wall openings of said first and second members being then substantially aligned so as to provide an air passageway between adjacent air cells within the confines of said rib structures.

2. An impact absorbing mat as claimed in claim 1 in which both said inner cell wall and said outer cell wall are of circular configuration.

3. An impact absorbing mat as claimed in claim 1 in which said cell walls have a cross-sectional configuration which is substantially a truncated triangle, with their maximum thickness being adjacent the respective base portion.

4. An impact absorbing mat as claimed in claim 1 in which the shape of individual ones of said cell wall sections, the geometrical arrangement of said cell wall sections within said rib structures, the sizes and shapes of said cell wall openings, the locations of said cell wall openings in their respective cell wall sections, and the locations of said cell wall openings in the cell wall sections of each of said resilient members relative to the locations of said cell wall openings in the cell wall sections of the other of said resilient members, are such that air flowing between one of said air cells encounters a resistance which varies as a composite function of the indentation of the particular air cell and of the direction of air travel.

5. An impact absorbing mat as claimed in claim 4 in which each of said cell wall openings includes a slit extending from the outer extremity of the cell wall to a point more than half way toward the associated base portion, and a hole at the inner end of said slit but spaced from said base portion.

6. A mat structure adapted to absorb the impact of a falling body, and after maximum indentation of the mat structure has occurred, to minimize the rebound force exerted upon said falling body, said mat structure comprising, in combination: first and second integrally formed resilient members, each of said resilient members having a substantially flat base portion and a plurality of cell wall sections extending perpendicularly outwardly from one side thereof; said first and second resilient members being adapted to be placed in substantially parallel relationship with said cell wall sections thereof in mutual interengagement so as to fully enclose a plurality of separate air cells lying in a common plane between said base portions of said members; said cell wall sections being of such configuration as to define, when said members are thus interengaged, restricted air passage means associated with each of said cells for discharging air therefrom in response to an impact thereon into the surrounding interior portions of said mat structure; the configuration of said cell wall sections being such that an impact upon one of said cells produces a telescopic contraction of the associated cell wall sections of said first and second resilient members, thereby changing the effective opening of said air passageway means as a function of the indentation of said mat structure in the vicinity of the impacted cell.

7. A mat structure as claimed in claim 6 wherein said mutually interengaging cell wall sections forming each of said cells include a pair of concentric cylinders.

8. A mat structure adapted to absorb the impact of a falling body, and after maximum indentation of the mat structure has occurred, to minimize the rebound force exerted upon said falling body, said mat structure comprising, in combination:

first and second integrally formed resilient members,
each of said resilient members having a substantially flat base portion and a plurality of cell wall sections extending perpendicularly outwardly from one side thereof;
said first and second resilient members being adapted to be placed in substantially parallel relationship with said cell wall sections thereof in mutual interengagement so as to fully enclose a plurality of separate air cells lying in a common plane between said base portions of said members;
the configuration of said wall sections being such that an impact upon one of said air cells produces telescopic contraction of the associated cell wall sections of said first and second resilient members and, thereby, compression of the respective air cell.

9. A mat structure adapted to absorb the impact of a falling body, and after maximum indentation of the mat structure has occurred, to minimize the rebound force exerted upon said falling body, said mat structure comprising, in combination:

first and second integrally formed resilient members,
each of said resilient members having a substantially flat base portion and a plurality of cell wall sections extending perpendicularly outwardly from one side thereof;
said first and second resilient members being adapted to be placed in substantially parallel relationship with said cell wall sections thereof in mutual interengagement so as to fully enclose a plurality of separate air cells lying in a common plane between said base portions of said members;
the configuration of said wall sections being such that an impact upon one of said air cells produces telescopic contraction of the associated cell wall sections of said first and second resilient members and, thereby, compression of the respective air cells;
said cell sections being of such further configuration as to define, when said members are thus interengaged, restricted air passage means associated with each of said air cells for discharging air therefrom in response to impact thereon into the surrounding interior portions of said mat structure.

10. A mat structure as claimed in claim 9 wherein:
said interengaging cell wall sections comprise telescopically interengaging cylinders.

11. A mat structure as claimed in claim 9 wherein:
at least one of said resilient members includes integral resilient static load supporting posts disposed between certain adjacent cell wall sections on said one member and engaging the other member to support static loads on said mat.

12. A mat structure as claimed in claim 9, wherein:
said resilient members include integral resilient static load supporting posts disposed in end to end abutment between certain adjacent cell wall sections to support static loads on said mat.

13. A mat structure as claimed in claim 9, wherein:
at least one of said resilient members includes integral resilient static load supporting posts disposed between adjacent cell wall sections on said one member and engaging the other member to support static loads on said mat, and ribs integrally joining each post to its adjacent cell wall sections.

14. A mat structure as claimed in claim 9, wherein:
said resilient members are identical and said interengaging cell wall sections comprise telescopically interengaging inner and outer cylinders,
each said member including a number of said inner and outer cylinders alternately arranged in spaced generally parallel rows.

15. A mat structure as claimed in claim 8, wherein:
said interengaging cell wall sections include integral interengaging resilient means for yieldably resisting telescopic contraction of the respective wall sections.

16. A mat structure as claimed in claim 9 wherein:
said interengaging cell wall sections comprise telescopically interengaging inner and outer cylinders, respectively;
said outer cylinders having an integral interior stepped configuration defining a plurality of axially spaced and presented annular shoulder surfaces facing the outer end of the respective cylinder and progressively increasing in diameter toward said outer end;
said shoulder surfaces being successively engaged by the outer end of the respective inner cylinder during telescopic contraction of the respective inner and outer cylinders, thereby to resist telescopic contraction of the respective cylinders.

17. A mat structure as claimed in claim 9 wherein:
said interengaging cell wall sections comprise telescopically interengaging inner and outer cylinders;
each pair of telescopically engaging inner and outer cylinders having generally helical, interengaging rib and groove means circumferentially spaced about the respective cylinders for relatively twisting the respective cylinders during telescopic contraction thereof thereby to resist said telescopic contraction of the respective cylinders.

18. A mat structure adapted to absorb the impact of a falling body, and after maximum indentation of the mat structure has occurred to minimize the rebound force exerted upon said falling body, said mat structure comprising, in combination:

a plurality of first and second rectangular, integrally formed resilient members;
each of said resilient members having a substantially flat base portion and a plurality of cell walls sections extending perpendicularly outwardly from one side thereof;
said first resilient members being disposed in side by side contact in a rectangular pattern including a number of contacting parallel rows of said first resilient members;
said second resilient members being disposed in side by side contact in a rectangular pattern including a number of parallel contacting rows of said second resilient members;
said first and second resilient members being placed one on top of the other in substantially parallel relation with said rows of members extending parallel to one another, with the geometric center of each upper member approximately overlying the four adjacent corners of four adjacent underlying members, and with said cell wall sections of the adjacent upper and lower members disposed in mutual interengagement so as to fully enclose a plurality of separate air cells lying in a common plane between said base portions of said upper and lower members;
the configuration of said cell wall sections being such that an impact upon one of said air cells produces telescopic contraction of the respective cell wall sections of the associated first and second resilient members, and thereby compression of the respective air cell;
said cell wall sections further being of such configuration as to define, when said resilient members are thus interengaged, restricted air passage means associated with each of said air cells for discharging air therefrom in response to an impact thereon into the surrounding interior portions of said mat structure.

19. An impact cushioning mat structure comprising:
an integrally formed resilient member having a substantially flat base portion and a plurality of first and second cell wall sections and static load supporting members extending perpendicularly outwardly from one side thereof, said first cell wall sections having central cavities, respectively, opening through the outer ends of said latter wall sections, and said second cell wall sections generally complementing said cavities, respectively, whereby a pair of said mat structures are adapted to be placed in substantially parallel relationship with said load supporting members on said mat structures in contact, and with said first cell wall sections on one mat structure coaxially aligned with said second cell wall sections on the other mat structure and said second cell wall sections on said one mat structure coaxially aligned with said first cell wall sections on said other mat structure to form a composite mat structure, wherein the aligned first and second cell wall sections are adapted to undergo telescopic contraction in response to an impact on the composite mat structure, and thereby dissipate the energy of the impacting body and, after maximum indentation of the composite mat structure has occurred, to minimize the rebound force exerted on said body.

20. A mat structure adapted to absorb the impact of a falling body, and after maximum indentation of the mat structure has occurred, to minimize the rebound force exexted upon said falling body, said mat structure comprising, in combination:

first and second integrally formed resilient members, each of said resilient members having a substantially flat base portion and a plurality of first and second cell wall sections and static load supporting means extending perpendicularly outwardly from one side thereof, said first cell wall sections having central cavities, respectively, opening through the outer ends of said latter wall sections, and said second cell wall sections generally complementing said cavities, respectively, said resilient members being adapted to be placed in substantially parallel relationship with said static load supporting means of said members in contact and with said first cell wall sections on one member coaxially aligned with said second cell wall sections on the other member and said second cell wall sections on said one member coaxially aligned with said first cell wall sections on said other member, whereby the aligned first and second cell wall sections are adapted to undergo telescopic contraction in response to said impact, thereby to dissipate the energy of the impacting body and, after maximum indentation of the mat structure has occurred, to minimize the rebound force exerted on said body.

References Cited by the Examiner

UNITED STATES PATENTS

| 647,873 | 4/1900 | Perry | 5—348 X |
| 1,166,811 | 1/1916 | Bowers | 182—137 X |
| 2,495,124 | 1/1950 | Morner | 5—348 |
| 2,619,659 | 12/1952 | Futternecht | 5—361 |
| 3,041,221 | 6/1962 | Judson et al. | 161—122 |

FOREIGN PATENTS 560,295   3/1944   Great Britain.

FRANK B. SHERRY, *Primary Examiner.*